United States Patent [19]

Zrnic et al.

[11] 4,328,093
[45] May 4, 1982

[54] DEVICE FOR SEPARATING GRANULATED MATERIAL FROM A FLUID FLOW

[75] Inventors: Nenad Zrnić; Branislav Bilen, both of Belgrade, Yugoslavia

[73] Assignee: The Institute of Technical Sciences of the Serbian Academy of Sci. & Art., Belgrade, Yugoslavia

[21] Appl. No.: 178,768

[22] Filed: Aug. 18, 1980

[30] Foreign Application Priority Data

Nov. 5, 1979 [YU] Yugoslavia ............................ 2705/79

[51] Int. Cl.³ ................................................ B03B 5/64
[52] U.S. Cl. ............................................ 209/3; 209/18; 209/208; 209/458; 209/493; 209/497; 299/7
[58] Field of Search ...................... 209/3, 18, 155, 208, 209/209, 493, 498, 497; 210/532.1, 533; 406/168, 170, 181; 299/7, 9

[56] References Cited

U.S. PATENT DOCUMENTS

| 743,201 | 11/1903 | Sherman | 209/208 |
| 763,444 | 6/1904 | Van Hoesen | 209/208 |
| 1,916,035 | 6/1933 | Berguerand | 209/208 |
| 2,538,340 | 1/1951 | Tomek et al. | 210/269 X |
| 4,078,997 | 3/1978 | Wright | 209/493 X |

FOREIGN PATENT DOCUMENTS 2846499 4/1979 Fed. Rep. of Germany .......... 209/3
456895 11/1936 United Kingdom ................ 209/155

Primary Examiner—Ralph J. Hill
Attorney, Agent, or Firm—Harness, Dickey & Pierce

[57] ABSTRACT

A device for separating and recovering solid particles or granulated material from a stream of fluid in a state of high purity and with minimal fluid remaining in the recovered solids. The device also provides a calibration or sizing of the recovered solids. More particularly, the device is suitable for recovering sand and gravel from a liquid slurry in dredging operations or the like and comprises a chamber into which the slurry is discharged in the form of two diametrically disposed impinging jets to decrease the kinetic energy of the slurry. The chamber is provided with one or a plurality of outlets disposed in communication with a corresponding number of channels each having a discharge port in the base thereof and a deflector in the discharge port, preferably disposed at an angle of about 45 degrees, for directing the concentrated lower layer of slurry in each channel through the discharge port into a deposition tank. Preferably, a plurality of deposition tanks are employed disposed in series for receiving the overflow from the downstream tank to effect recovery and classification of the recovered particulated solids.

10 Claims, 4 Drawing Figures

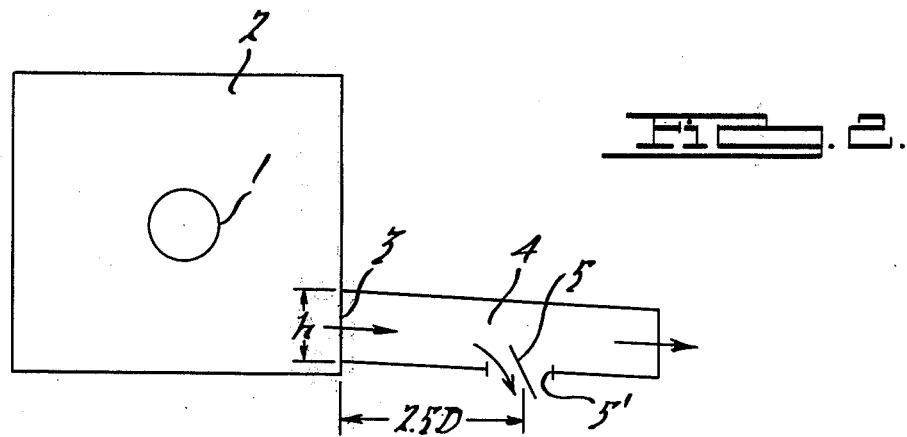
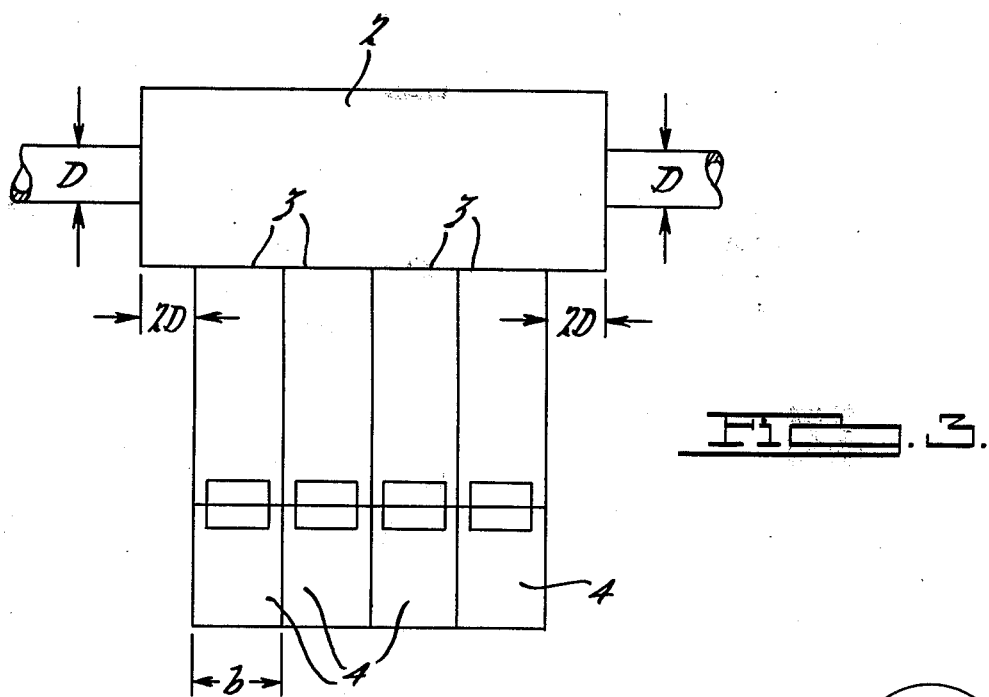
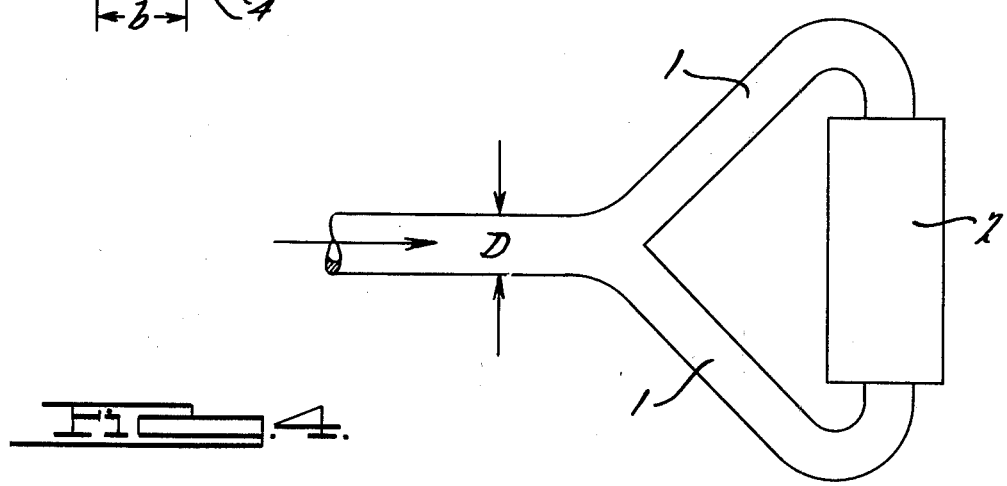

DEVICE FOR SEPARATING GRANULATED MATERIAL FROM A FLUID FLOW

BACKGROUND OF THE INVENTION

Sand and/or gravel mixed with water in the form of a slurry are lifted from the river bottom by means of dredging pumps connected to a suction pipe. The capacity of these pumps range from about 1,000 to 10,000 cubic meters per hour (m$^3$/h) of slurry having a volume concentration of solids ranging from about 8 to 20 percent, depending on the character of the soil being dredged. Such a comparatively low grade slurry has great kinetic energy as the speed of its motion through the pipes is 2 or more meters per second in order to avoid the deposition of the transported material, i.e. the clogging of the pipe. In most cases the gravel or the sand is loaded on vessels or barges of varying tonnage, and is transported to an unloading point. The loading of the sand and/or gravel is performed by pouring the slurry into the vessel's hold in which the gravel, as the useful cargo, is deposited, while the water, having served its purpose as the transportation medium, flows back into the river over the rim or through special overflow ports in the vessel's hold.

During the loading or unloading operation when the sand and gravel slurry is carried by means of pipes in accordance with prior art techniques, the following problems arise:

1. Because of the high kinetic energy of the slurry, it cannot be loaded on small capacity vessels or on standard cargo boats. Accordingly, high capacity dredgers can only use large specially built vessels, which create difficulties with regard to the economical use of available vessels and barges.

2. Because of the high kinetic energy of the slurry, part of the useful particulate material from the slurry fails to deposit and is carried back to the river. This results in a longer loading time of the vessel, i.e. a higher energy consumption per unit of useful material. Additionally, it is frequently impossible to load the vessel fully, so that besides the useful sand and/or gravel material, the vessels also contain appreciable amounts of useless water.

3. The useful particulate material deposited from the slurry also contains, in most cases, mud and other harmful components, and it is therefore necessary that it be washed before use in building projects, and this causes an appreciable increase in costs.

4. The water which carries the particulate material to the bank for embanking or for final use spreads the particulate material over a large area, so that considerable mechanization must be used. If the slurry were concentrated before leaving the suction pipe, i.e. if the water were separated from it, the need for such mechanization would be decreased considerably.

The object of this invention is a device by means of which the above shortcomings are removed.

The device of the present invention can also be used for separating other types of granulated material from a fluid flow and for the rough calibration thereof.

The device of the invention functions in such a way that the useful components (sand or gravel) are separated in a moist state or with a negligible percentage of water at one outlet from the continuously fed slurry and the useful particulate components are simultaneously washed. At another outlet, a continuous separation of the water which has served as the transportation medium of the particulate components is simultaneously carried out.

BRIEF DESCRIPTION OF THE DRAWINGS

The device comprising the present invention is shown in the drawings for the separation of sand and/or gravel, wherein:

FIG. 2 is a diagrammatic side elevational view of the separating section of the device shown in FIG. 1;

FIG. 3 is a plan view of the separating section shown in FIG. 2 and;

FIG. 4 is a diagrammatic plan view of a section of the device for reducing the kinetic energy of the slurry.

DESCRIPTION OF THE PREFERRED EMBODIMENTS

Figure 1:
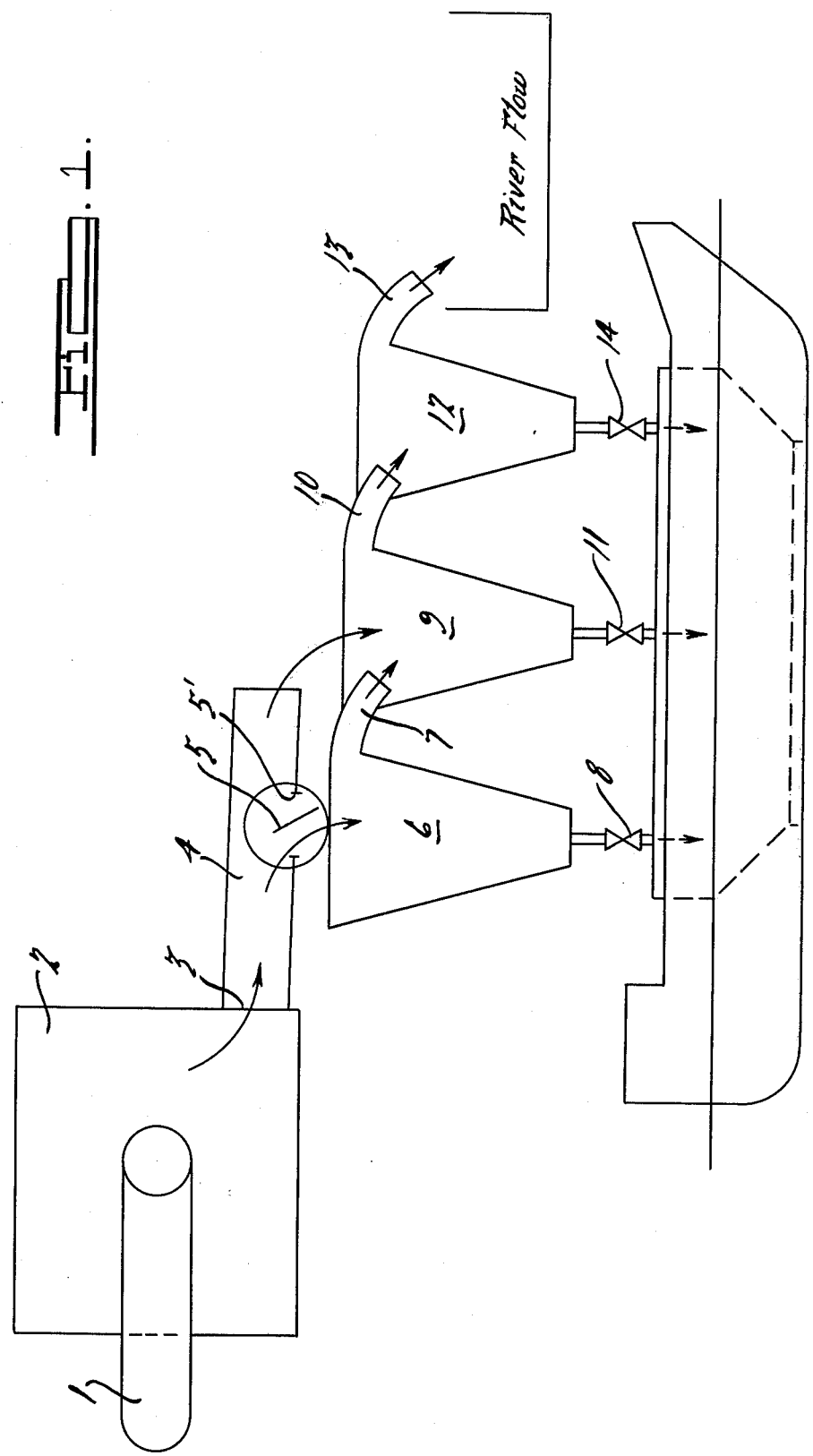
FIG. 1 is a diagrammatic fragmentary side elevational view of the device and a vessel being loaded.

The device of the present invention comprises a part for reducing the kinetic energy, a part for separating the particulate material and water and a part for depositing the particulate material.

The part for reducing the kinetic energy comprises a breeches pipe 1 and a chamber 2 as best seen in FIG. 4. The breeches pipe 1 is made with radii in conformity with the hydrodynamic rules for the turning of a jet and as a function of the pipe diameter. Chamber 2 is formed as a box and its measurements depend upon the diameter D of pipe 1 and on the speed at which the slurry is transported. Chamber 2 has one or a plurality of discharge orifices 3 as shown in FIGS. 2 and 3.

The principle used for reducing the kinetic energy is the collision between two jets. The collision of the two jets must take place at a position within the chamber 2 when they have already sufficiently left the pipe, to avoid disturbances in the operation of the pump, i.e., a reduction of its effect. A similar result, but of somewhat smaller intensity, can be achieved by multiple breakage and sharp turning of the jet.

The part for separating the particulate material from the liquid comprises one or a plurality of channels 4 connected to the orifices 3 and each channel is provided with a deflector 5 as shown in FIGS. 2 and 3. A port 5' is provided on the bottom of each channel 4. The discharge orifices 3 are positioned at a distance of about 2D from the ends of chamber 2 as shown in FIG. 3 and the total area of these orifices should be six to seven times as large as the section area of pipe 1 which is expressed by the formula: $(6 \text{ to } 7) \times D^2\pi/4$. Channel 4 has a width b and a height h.

The channels 4 and the discharge orifices 3 are of a rectangular cross section. A ratio of width b to height h of about 2, i.e. $b/h \approx 2$, is used for each of the four channels 4 as shown in the specific embodiment illustrated. Therefore, the total width of the channels used provides a ratio of about 8 to 1, i.e. $b/h \approx 8$. The length of channel 4 should be such that the deflectors 5 can be easily accommodated, while the distance between the orifice 3 and the deflector 5 is about 2 to 2.5D. The length of the remaining part of channel 4 is adapted to the deposition overflow tanks 6, 9 and 12 as shown in FIG. 1.

Deflector 5 is a sheetmetal baffle fixed in a position which usually forms an angle of about 45° with the bottom of the channel. It extends over the whole width of the channel and its height is selected so that the upper edge of the deflector 5 is about 0.2 to 0.25 h. A deflector 5 is located in each of the ports 5' of channels 4.

The principle used in the separating section is motion in a sub-critical speed range of 0.5 to 0.9 meters per second (m/s), in which a horizontal flow would certainly clog the device because of quick deposition of the transported solids. To avoid this, chamber 2 and channel 4 are inclined at an angle which is determined experimentally. The flow in this subcritical speed range is clearly separated into two layers. The upper layer in the channel contains water and the muddy components of the material, while in the bottom layer, the useful solids move at a somewhat lower speed. Deflector 5 deflects the bottom layer of the incoming flow of the mixture in which the solids are concentrated, forcing it to fill the first deposition tank 6 disposed below the ports 5' as shown in FIG. 1.

The part for depositing the particulated material comprises a tank, but it is more convenient to have three or more tanks (FIG. 1). Each of these tanks (6, 9, 12) has parts for charging, for overflowing and for discharging.

Tank 6 is charged with the concentrated mixture via the deflector 5, through the port 5' in each of the channels 4. Tank 6 overflows via the outlet 7 into tank 9 and the particulated material in tank 6 is discharged through a valve or flap 8 into a vessel's hold as illustrated in FIG. 1 or into the stock of material on the bank.

Tank 9 is charged from the outlet ends of channels 4 and overflow outlet 7 of tank 6. Tank 9 overflows via an outlet 10, and the particulated material in tank 9 is discharged through the valve or flap 11.

Tank 12 is charged via the overflow outlet 10, and overflows via the outlet 13 into the river. The particulated material in tank 12 is discharged through the flap 14 either into a means of transport or back into the river, depending on the size of the solids.

By means of the overflow from one tank to another, a rough calibration or sizing of the particulated material is also achieved. In the first tank 6 the bigger particles will be retained. In the second tank 9, smaller ones, and in the third tank 12 the smallest.

The size of the tanks depends upon the diameter D of the feeding pipe and is determined experimentally for all the values of the suction pipe diameter which are used in practice.

It will be appreciated by those skilled in the art that the described device is not limited to the specific embodiment described above but can also be applied, as already said, in other technical fields.

We claim:

1. A device for separating solid particles from a moving liquid slurry stream comprising a chamber having a bottom, a pair of spaced end panels and a side panel, conduit means for conveying a slurry into said chamber and formed with a pair of discharge ports in said end panels for discharging said slurry in the form of substantially diametrically opposed impinging jets, an outlet port in the lower portion of said side panel of said chamber disposed in communication with a channel having a base and spaced side walls, a port formed in said base spaced downstream from said outlet port, a deflector extending between said side walls above said port terminating at an upper edge disposed intermediate of the height of said side walls and positioned to intercept and direct the lower layer of slurry flowing in said channel through said port, and deposition means disposed below said port for receiving the slurry discharged through said port in said channel.

2. The device as defined in claim 1 in which said deposition means comprises a tank having an overflow in the upper portion thereof and discharge means in the lower portion thereof for discharging the separated solid particles therefrom.

3. The device as defined in claim 1 in which said deposition means comprises a plurality of tanks each having an overflow in the upper portion thereof and discharge means in the lower portion thereof for discharging the separated solids therefrom, a first of said tanks arranged to receive the slurry from said port in said channel and oriented with said overflow to discharge into a second of said tanks.

4. The device as defined in claim 3 in which said second of said tanks is oriented to receive the residual slurry from the end of said channel passing beyond said port in said channel and having said overflow oriented to discharge into a third of said tanks.

5. The device as defined in claim 1 in which said bottom panel of said chamber and said base of said channel are inclined downwardly in the direction of flow of the slurry in said channel.

6. The device as defined in claim 1 in which the cross sectional area of said channel ranges from about 6 to about 7 times the cross sectional area of said conduit means.

7. The device as defined in claim 1 in which said outlet port in said chamber extends longitudinally in said side panel and terminates at a position spaced about two diameters of said conduit means from each said end panel.

8. The device as defined in claim 1 in which said port in said channel is spaced from said outlet port in said chamber a distance of about 2 to about 2.5 times the diameter of said conduit means.

9. The device as defined in claim 1 in which said deflector is disposed transversely in said channel at an angle of about 45° relative to said base.

10. The device as defined in claim 1 comprising a plurality of channels disposed in side-by-side relationship in which the sum of the widths of said channels is about 8 times the height thereof.

* * * * *